United States Patent
Seo et al.

(10) Patent No.: US 8,867,639 B2
(45) Date of Patent: Oct. 21, 2014

(54) FEEDBACK METHOD FOR VIRTUAL MIMO TRANSMISSION IN WIRELESS AD-HOC COMMUNICATION SYSTEM

(71) Applicants: Hanbyul Seo, Anyang-si (KR); Dongku Kim, Seoul (KR); Sungyoon Cho, Seoul (KR); Soonsuk Roh, Seoul (KR); Byounghoon Kim, Anyang-si (KR); Kaibin Huang, Hong Kong (CN)

(72) Inventors: Hanbyul Seo, Anyang-si (KR); Dongku Kim, Seoul (KR); Sungyoon Cho, Seoul (KR); Soonsuk Roh, Seoul (KR); Byounghoon Kim, Anyang-si (KR); Kaibin Huang, Hong Kong (CN)

(73) Assignees: LG Electronics Inc., Seoul (KR); Industry-Academy Cooperation Foundation, Yonsei University, Seoul (KR)

( * ) Notice: Subject to any disclaimer, the term of this patent is extended or adjusted under 35 U.S.C. 154(b) by 0 days.

(21) Appl. No.: 13/868,651

(22) Filed: Apr. 23, 2013

(65) Prior Publication Data
US 2013/0279613 A1 Oct. 24, 2013

Related U.S. Application Data

(60) Provisional application No. 61/636,731, filed on Apr. 23, 2012.

(51) Int. Cl.
*H04K 1/10* (2006.01)
*H04B 7/04* (2006.01)
*H04B 7/02* (2006.01)

(52) U.S. Cl.
CPC .............. *H04B 7/0417* (2013.01); *H04B 7/024* (2013.01)
USPC .......................................... 375/260

(58) Field of Classification Search
USPC .......................................... 375/260
See application file for complete search history.

(56) References Cited

U.S. PATENT DOCUMENTS

| 8,345,693 | B1* | 1/2013 | Kim ............................... 370/400 |
| 8,416,682 | B2* | 4/2013 | Li et al. .......................... 370/218 |
| 8,428,162 | B2* | 4/2013 | Forenza et al. ................ 375/260 |
| 2004/0114618 | A1* | 6/2004 | Tong et al. ..................... 370/431 |
| 2007/0171808 | A1* | 7/2007 | Wu et al. ....................... 370/208 |
| 2008/0014884 | A1* | 1/2008 | Oyman et al. ............... 455/187.1 |
| 2008/0153428 | A1* | 6/2008 | Han et al. ......................... 455/69 |
| 2009/0197540 | A1* | 8/2009 | Wild et al. .................. 455/67.14 |
| 2010/0085917 | A1* | 4/2010 | Gorokhov et al. ............ 370/328 |
| 2010/0091697 | A1* | 4/2010 | Vucetic et al. ................ 370/315 |
| 2010/0278169 | A1* | 11/2010 | Wang et al. .................... 370/345 |
| 2012/0099470 | A1* | 4/2012 | Li et al. ......................... 370/252 |
| 2012/0231739 | A1* | 9/2012 | Chen et al. .................... 455/41.2 |

OTHER PUBLICATIONS

Adrian Agustin and Josep Vidal, "Amplify-and-Forward Cooperation under Interference-Limited Spatial Reuse of the Relay Slot", IEEE Transactions on Wireless Communications, vol. 7, No. 5, May 2008, pp. 1952-1962.*

* cited by examiner

*Primary Examiner* — Daniel Washburn
*Assistant Examiner* — Berhanu Tadese
(74) *Attorney, Agent, or Firm* — Mckenna Long & Aldridge LLP

(57) ABSTRACT

A method for communicating between first multiple nodes and second multiple nodes in a wireless communication system is disclosed. The second multiple nodes may perform a first local sharing procedure for a virtual MIMO (Multiple Input Multiple Output) feedback during a first predetermined time. And then, the second multiple nodes may transmit feedback of channel status information to the first multiple nodes during an integer multiple of a second predetermined time. Finally, the first multiple nodes may perform a second local sharing procedure for the virtual MIMO feedback during the first predetermined time.

13 Claims, 13 Drawing Sheets

- Prior Art -

FEEDBACK METHOD FOR VIRTUAL MIMO TRANSMISSION IN WIRELESS AD-HOC COMMUNICATION SYSTEM

This application claims the benefit of the U.S. Provisional Applications 61/636,731, filed on Apr. 23, 2012, which is hereby incorporated by reference as if fully set forth herein.

BACKGROUND OF THE INVENTION

1. Field of the Invention

The present invention relates to a wireless communication system. And, more particularly, the present invention relates to feedback method for virtual MIMO (Multiple Input Multiple Output) transmission in wireless ad-hoc communication system.

2. Discussion of the Related Art

Distributed wireless network consist of multiple nodes distributed in a certain area where the nodes are able to organize clusters and to communicate with each other. Recently, since the rapid increase of nodes is required for high throughput and for the practical use of the MIMO system, a cooperative communication method, called as virtual-MIMO, has become one of the solutions.

FIG. 1 illustrates a concept of the virtual-MIMO transmission.

Referring to FIG. 1, in virtual-MIMO, uniformly distributed nodes with single antenna share their information and construct cluster to jointly transmit to the nodes cooperated to receive the data. However, there are still many challenging problems in this system. One of the main challenges is the channel state information (CSI) feedback in limited feedback (finite-rate feedback) environment. Two main objects of precoding are to mitigate the interferences and to customize the transmitted signal into the eigenstructure of the matrix channel with the knowledge of the channel. For precoding, the full CSI is required at the transmitter. In time-division duplex (TDD) systems, full channel state information is known that it is able to be adapted by the reverse-link signal-to-interference-and-noise ratios (SINRs).

However, in frequency-division duplex (FDD) systems, CSI is known at the transmitter through feedback channel. In practical system, the effects of the limited feedback are important issues to design a virtual-MIMO system in distributed wireless network. In prior art (e.g., Hierarchical Cooperation Achieves Optimal Capacity Scaling in Ad Hoc Networks, IEEE Trans. Inform. Theory, vol. 56, no. 3, pp. 1369-1377 2007.), the virtual-MIMO transmission with nodes cooperation shown optimal capacity scaling are studied, and a hierarchical cooperation system is introduce, where there is a main communicating clusters divided into sub-clusters hierarchically for data sharing. However, it does not consider limited feedback environment. The motivation of this patent is to propose an efficient CSI feedback system using virtual-MIMO transmission in distributed wireless network.

SUMMARY OF THE INVENTION

Accordingly, the present invention is directed to a feedback method for virtual MIMO transmission in wireless ad-hoc communication system that substantially obviates one or more problems due to limitations and disadvantages of the related art.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the present invention, as embodied and broadly described, in a method for communicating between first multiple nodes and second multiple nodes in a wireless communication system, the method includes the steps of performing a first local sharing procedure for a virtual MIMO (Multiple Input Multiple Output) feedback among the second multiple nodes during a first predetermined time; performing feedback of channel status information from the second multiple nodes to the first multiple nodes during a integer multiple of a second predetermined time; and performing a second local sharing procedure for the virtual MIMO feedback among the first multiple nodes during the first predetermined time.

Here, the second multiple nodes are included in a destination cluster and the first multiple nodes are included in a source cluster.

Preferably, the second predetermined time is determined based on a total feedback time and the first predetermined time. Further, each of feedback channels the first multiple nodes and the second multiple nodes is orthogonal.

More specifically, the first local sharing procedure is used for sharing the channel status information and quantized precoder among the second multiple nodes. Further, the second local sharing procedure is used for sharing the feedback among the first multiple nodes.

More preferably, the first multiple nodes and the second multiple nodes are mobile stations. However, the first multiple nodes are transmitters and the second multiple nodes are receivers. In this case, each of the first multiple nodes is used for a virtual transmit antenna, and each of the first multiple nodes is used for a virtual receive antenna.

In another embodiment of the present application, a wireless communication system is disclosed. The wireless communication system comprised of a first cluster including first multiple nodes, wherein each of the first multiple nodes is used for a virtual transmit antenna; and a second cluster including second multiple nodes, wherein each of the first multiple nodes is used for a virtual receive antenna, wherein the second multiple nodes perform a first local sharing procedure for a virtual MIMO (Multiple Input Multiple Output) feedback among during a first predetermined time, wherein feedback of channel status information is transmitted from the second multiple nodes to the first multiple nodes during a integer multiple of a second predetermined time, wherein the first multiple nodes performs a second local sharing procedure for the virtual MIMO feedback among during the first predetermined time.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
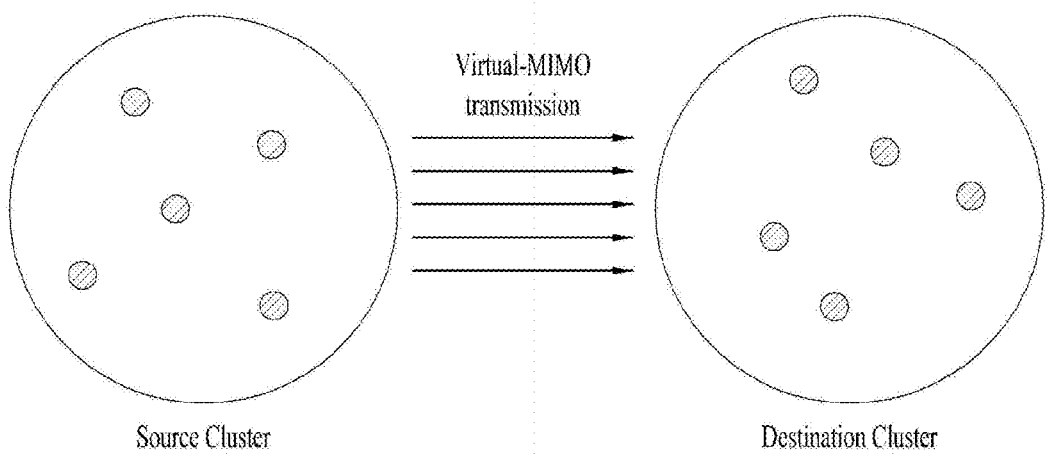
FIG. 1 illustrates a concept of the virtual-MIMO transmission.

Reference will now be made in detail to the preferred embodiments of the present invention, examples of which are illustrated in the accompanying drawings. The detailed description of the present invention is provided to facilitate the understanding of the configuration, operation, and other characteristics of the present invention provide a description of an exemplary embodiment of the present invention. The following embodiments of the present invention correspond to an exemplary system having the technical features of the present invention applied therein.

The specific terms used in the following description of the present invention are provided to facilitate the understanding of the present invention. And, therefore, without deviating from the technical scope and spirit of the present invention, the usage of such specific terms may also be varied to different forms.

For MIMO precoding systems, the CSI feedback overhead has motivated the research on efficient CSI quantization and feedback algorithms so called limited feedback. Limited feedback addresses the interference between multi data streams even when a zero-forcing scheme is applied. The residual interference after applying the zero-forcing scheme can be adjusted by the number of CSI feedback bits, and this gives the motivation of studying an efficient feedback algorithm.

The basic concept of a system with limited feedback is that the channel information or a transmit precoder is chosen from a finite set of matrices called codebook. Both receiving nodes and transmitting nodes share the same codebook, and the index of the codebook is transmitted from the receive node to the transmit node. Different limited feedback algorithms have been studied through years for practical implementation of wireless networks, such as a limited feedback with multi-antennas in single user, a multi-user downlink feedback, a feedback for cognitive radio networks, a limited feedback in space division multiple access (SDMA), a limited feedback for spatial multiplexing systems and for the case of transmit beamforming. In the present application, it is suggested a new feedback method suitable for virtual-MIMO system with no wired network between nodes in a single cluster.

The main feature of the new feedback method of the present application is that the virtual-MIMO feedback transmission is done with spatial parallel streams. Previous research on limited feedback was done by independent feedback, where each of receiving nodes transmits the index of its quantized CSI or precoder independently using allocated time-slots each. This is to avoid the collision occurrence when all of the nodes transmit feedback signal simultaneously, which will give interference to all the other nodes.

However, in the virtual-MIMO feedback, the nodes in a data transmission cluster actively receive feedback signal by a zero-forcing reception instead of a passive reception as in the conventional independent feedback. This will cancel interferences from other nodes. Still, there is an overhead required for this process. Due to the absence of a wired network between nodes in a cluster, the transmitting nodes in source cluster requires local exchange for sharing received feedback signal and data stream for forward link data transmission.

We consider a distributed wireless network where a number of nodes having data to transmit are distributed in cluster S, and a number of nodes wishing to receive the data are distributed in cluster D. All nodes are equipped with single antenna for a practical sense. Out of all the pair of nodes, it is necessary to select few data streams in a good condition and a good precoder for transmission.

Antenna subset selection has been an important example of limited feedback precoding for optimal set of transmit antennas computed to the transmitter. To perform virtual-MIMO transmission, CSI of precoder feedback is required and in this research, we propose an efficient feedback system for this network. The main contribution of this research is to achieve spatial multiplexing gain by virtual-MIMO feedback, where all the nodes in D transmits its own CSI or precoder in parallel and exchanges CSI with the absence of wired backhaul links between nodes in both cluster. From the proposed feedback strategy, increasing the number of feedback bits leads to the increase of codebook size and reduces the residual interference after zero-forcing. We introduce systems where only cluster S is cooperated for forward link data transmission to minimize the local exchange overhead and where both clusters cooperating to maximize the eigen values of the transmitted signal.

<A. Feedback Designs for Virtual-MIMO Precoding>

Figure 2:
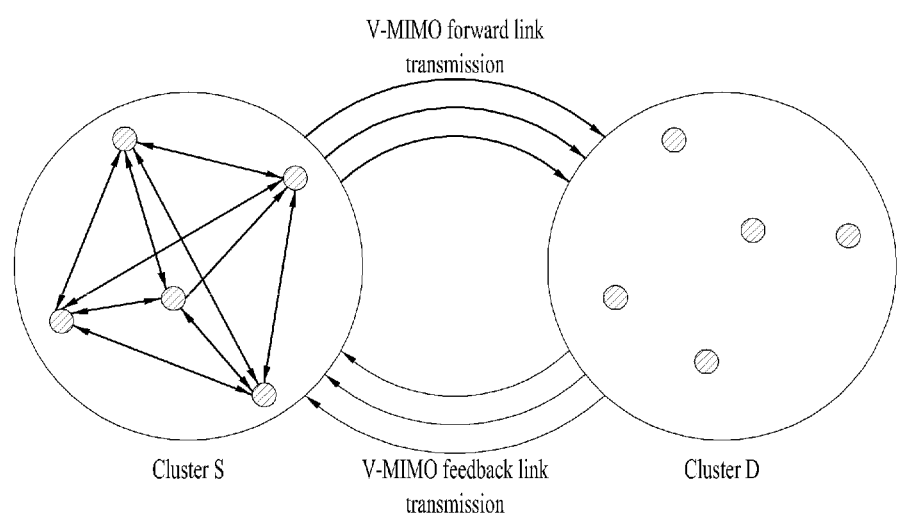
FIG. 2 illustrates a Virtual-MIMO structure with one cluster cooperation.

Firstly, we derive the performance of virtual-MIMO feedback where only one cluster (for example, cluster S) cooperate for local exchange and compare to the conventional unclustered independent feedback, as shown in FIG. 2.

FIG. 2 illustrates a Virtual-MIMO structure with one cluster cooperation

In earlier research on limited feedback, each receiver quantizes its CSI and broadcasts to the transmitters independently with each assigned resource. Here, we use time-slots to define the resource for feedback. The main reason for transmitting feedback to the nodes in cluster S independently dividing total time resource into the total number of pair of nodes N is to prevent the collision that might occur when transmitting the feedback signal at the same time. The difference in the proposed virtual-MIMO system compared with the conventional independent feedback is that the nodes in cluster S which requires the CSI feedback signal actively receives feedback signal instead of passively receiving. The principle of this chapter is to show that we can achieve spatial multiplexing gain on feedback by virtual-MIMO feedback with only one cluster cooperation using zero forcing precoding at forward link data transmission. Since the precoding performance is sensitive to the CSI, by increasing the codebook size we can reduce the quantization error. The key fact is to increase the codebook size by giving spatial multiplexing gain and increase the number of feedback bits by using virtual-MIMO feedback.

A-1) Zero-Forcing Decoding at Feedback Link

We apply zero-forcing (ZF) receiver to the nodes in cluster S to recover the received feedback signal. In order to successfully apply ZF receiver, each node in cluster S requires the knowledge of feedback signal received by the all other neighbor nodes in cluster S. After all the nodes in cluster S gather the signals stated in earlier section by local exchange, we apply zero-forcing receive filter to the gathered signals, where $\tilde{W}=[\tilde{w}_1, \ldots, \tilde{w}_N]$ is $\tilde{W}=(G^H G)^{-1} G^H$, which is the pseudo inverse operation where $\tilde{G}=[\tilde{g}_1, \ldots, \tilde{g}_N]^T$ is the feedback channel matrix. The followings are the procedure of the feedback.

Firstly, nodes in destination cluster transmits CSI feedback signal to nodes in source cluster. And, all nodes in source cluster relay their received signal to other neighbor nodes. Finally, zero-forcing filter is applied and feedback signal is decoded.

The sum rate capacity of feedback channel after applying ZF (zero-forcing) receiver is expressed as following Equation 1.

$$C_{FB} = \sum_{n=1}^{N} \log\left(1 + \frac{P d_{nn}^{-\alpha} |\tilde{w}_n g_n|^2}{\sum_{m=1, m \neq n}^{N} P d_{nm}^{-\alpha} |\tilde{w}_n g_m|^2 + N_0}\right) \quad \langle\text{Equation 1}\rangle$$

In Equation 1, $d_{nm}$ is the distance between $m^{th}$ node in cluster D and $n^{th}$ node in cluster S.

A-2) Local Exchange

After the nodes in cluster S receive CSI feedback signal from nodes in cluster D, the nodes may broadcast the received CSI feedback signal to the neighbor nodes in the cluster S. This step is required for zero-forcing receiver introduced in the earlier section. Time division multiple access (TDMA) is applied and the capacity is given by following Equation 2.

$$C_{local} = N(N-1)\log\left(1 + \frac{P d_{local}^{-\alpha}}{N_0}\right) \quad \langle\text{Equation 2}\rangle$$

In Equation 2, P is the transmission power, $d_{local}$ is the average distance between nodes in cluster, $\alpha$ is the path loss component and $N_0$ is the noise variance.

In contrast to the conventional independent feedback, by using the virtual-MIMO feedback transmission, the spatial multiplexing gain can be achieved. While the nodes in the cluster S receive feedback signal passively in the conventional independent feedback, they will receive the feedback signal actively in the virtual-MIMO feedback and decode the signal transmitted from the nodes in cluster D. Since the nodes in the cluster D transmit difference information, their own CSI, to their desired nodes in cluster S, the spatial multiplexing gain can be achieved by using virtual-MIMO.

By giving the total feedback time as $T_{total}$, the time-slot used for virtual-MIMO feedback can be denoted as $T_{total} - T_{local}$. The definition of $T_{local}$ is the number of time-slots used for local exchange where a node in cluster S exchanging the received signal with its neighbor nodes in cluster S. Then the nth node in cluster D transmits the index of the codebook, using $B_{v-MIMO}(n)$ bits denoted as following Equation 3.

$$B_{v-MIMO}(n) = (T_{total} - NT_{local}) \times F_{FB,n}(n) \quad \langle\text{Equation 3}\rangle$$
$$= T_{vmimo} \log\left(1 + \frac{P d_{nn}^{-\alpha} |\tilde{w}_n g_n|^2}{\sum_{m=1, m \neq n}^{N} P d_{nm}^{-\alpha} |\tilde{w}_n g_m|^2 + N_0}\right)$$

In Equation 3, $T_{vmimo}$ is $T_{total} - NT_{local}$. The number of total feedback bits used in $T_{local}$ is following Equation 4.

$$B_{FB,v-MIMO} = B_{v-MIMO}(1) + \ldots + B_{v-MIMO}(N) \quad \langle\text{Equation 4}\rangle$$

Due to the absence of wired backhaul links between nodes cluster S, the local exchange is counted as overhead. The overhead defined as the time-slots used for local exchange at each node assuming the B feedback bits was transmitted from the node in cluster D can be expressed as following Equation 5.

$$T_{local} = \frac{B}{\text{local}} = \frac{B}{N(N-1)\log\left(1 + \frac{P d_{local}^{-\alpha}}{N_0}\right)} \quad \langle\text{Equation 5}\rangle$$

Since the difference of distance between nodes in cluster S is assumed to be small, the average distance $d_{local}$ is configured as the distance between nodes in cluster S.

Figure 3:
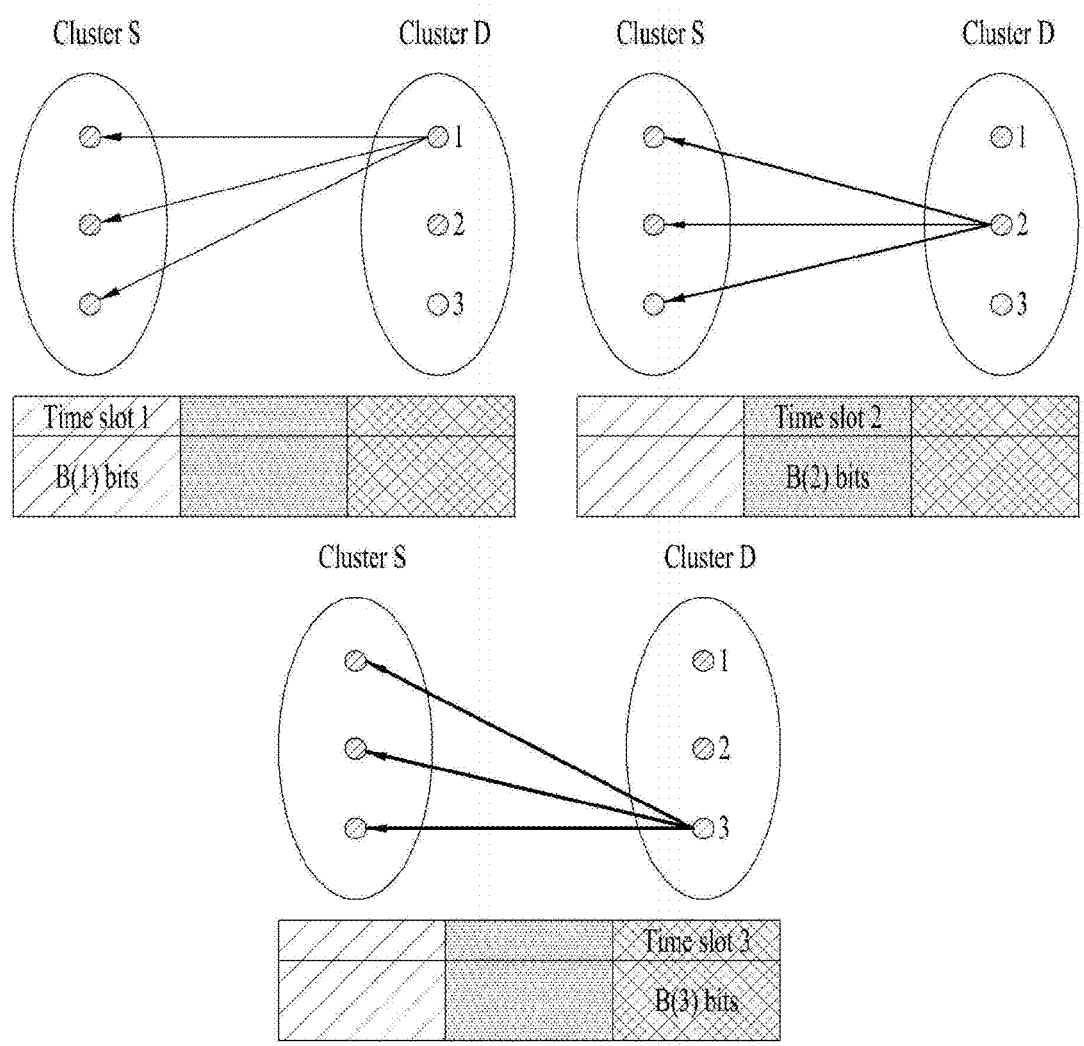
FIG. 3 illustrates Conventional independent feedback transmission when N=3.
Figure 4:
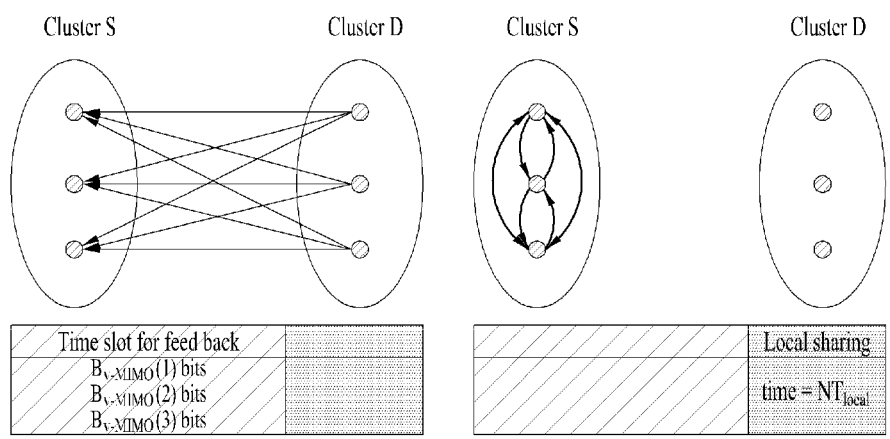
FIG. 4 illustrates Virtual-MIMO feedback transmission when N=3.

The example of comparing conventional independent feedback and virtual-MIMO feedback when N=3 is shown in FIG. 3 and FIG. 4.

FIG. 3 illustrates Conventional independent feedback transmission when N=3. And, FIG. 4 illustrates Virtual-MIMO feedback transmission when N=3.

Referring to FIGS. 3 and 4, when total time resource is allocated for feedback transmission, each node in cluster D uses $T_{total}$ (=3) time-slots for its CSI feedback transmission. This is to avoid the collision occurrence when every nodes in the cluster D causes interference to each other while transmitting the feedback signal at the same time.

As illustrated in FIG. 3, when total 3 pair of nodes are located in each cluster S and cluster D, each node in cluster D transmits its CSI, the index of the codebook sequentially using one time-slot each. The $n^{th}$ node in cluster D transmits CSI using B(n) bits denoted as following Equation 6.

$$B(n) = \frac{T_{total}}{3} \times F_{FB,n}(n) \quad \langle\text{Equation 6}\rangle$$
$$= \frac{T_{total}}{3} \log\left(1 + \frac{P d_{nn}^{-\alpha} |\tilde{w}_n g_n|^2}{\sum_{m=1, m \neq n}^{3} P d_{nm}^{-\alpha} |\tilde{w}_n g_m|^2 + N_0}\right)$$

Figure 5:
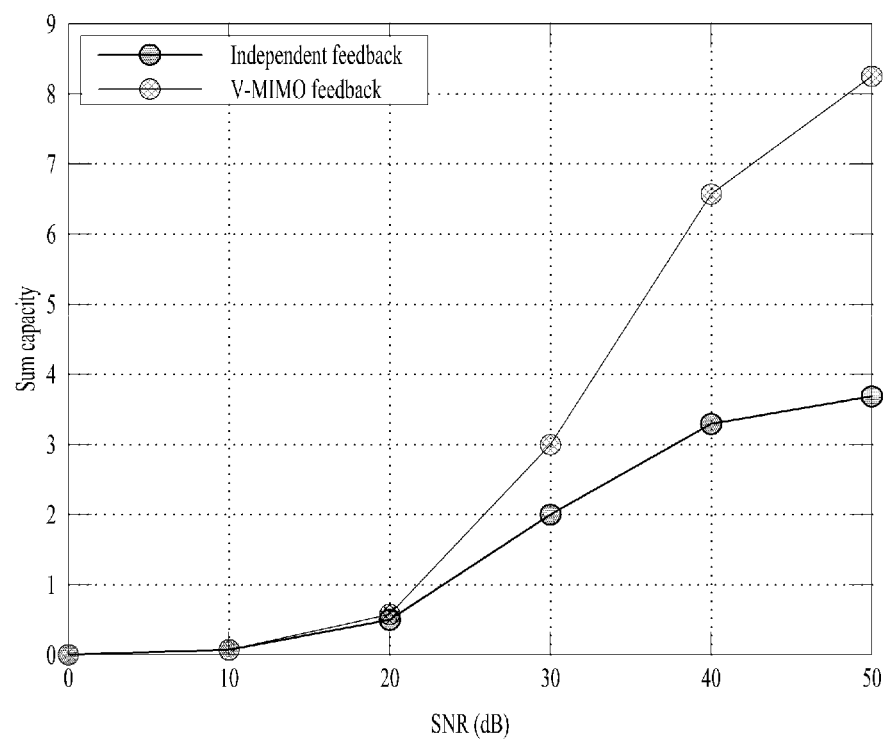
FIG. 5 illustrates comparison of sum-rate with one cluster cooperation between independent feedback and Virtual-MIMO feedback.

FIG. 5 illustrates comparison of sum-rate with one cluster cooperation between independent feedback and Virtual-MIMO feedback. And, FIG. 6 illustrates comparison of sum-rate with different ratio of the distance between independent feedback and Virtual-MIMO feedback.

Figure 6:
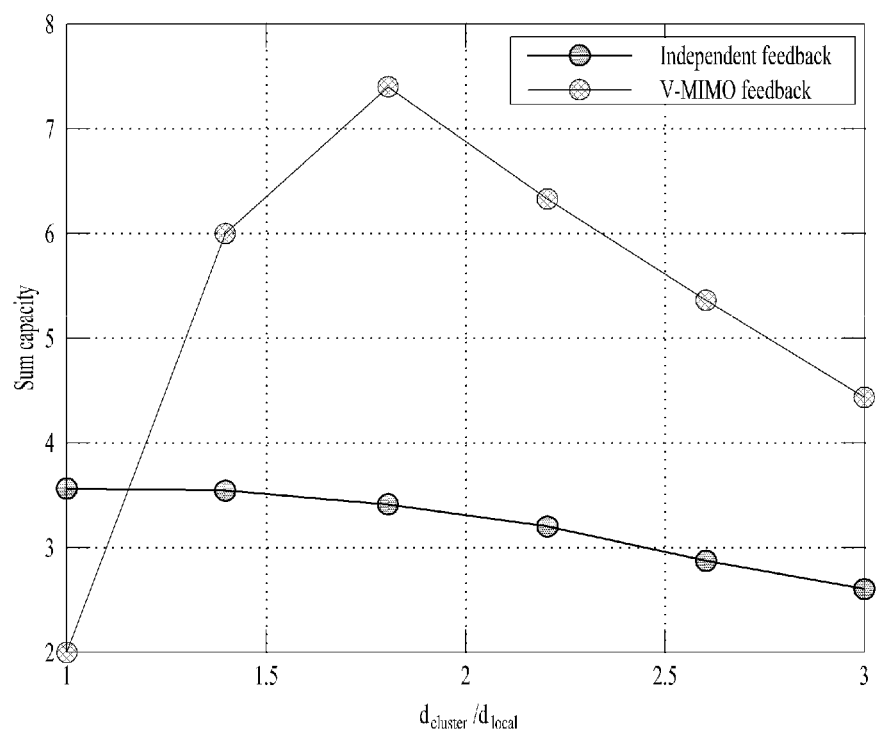
FIG. 6 illustrates comparison of sum-rate with different ratio of the distance between independent feedback and Virtual-MIMO feedback.

Referring to FIGS. 5 and 6, it can be noted that the simulation is done with 6 pair of nodes distributed in each cluster S and cluster D when the ratio of the distance between nodes in a single cluster S and the distance between clusters $d_{cluster}=d_{local}$ is 5. The nodes in cluster S then select 3 data streams with maximum forward link channel gain. The channel coefficients of feedback channel are considered steady during whole process time $T_{local}$.

As shown in FIG. 5, in the circumstance of $d_{cluster}<<d_{local}$, virtual-MIMO shows 150% of the sum rate capacity performance compare to the conventional independent feedback at SNR=30 dB. In FIG. 6, the sum-rate capacity of two different feedback system when SNR is 20 Db is drawn with different ratio of the distance between nodes in cluster S and the distance between two clusters. The performance of virtual-MIMO feedback is worse than the conventional feedback when the ratio of the distance $d_{cluster}=d_{local}$ is under 1.2. This is because the local exchange overhead is large enough to reduce the number of total time-slots used for feedback transmission. Until the ratio of the distance becomes around 1.8, the capacity of the virtual-MIMO feedback increases and this implies that the local exchange overhead has larger affect than path loss and we can have the gain by increasing the number of feedback bits as the time-slots used for local exchange is reducing and after the ratio becomes 1.8, path loss begins to affect the performance.

<B. Virtual-MIMO Equalization with Receiver Cluster Cooperation>

Figure 7:
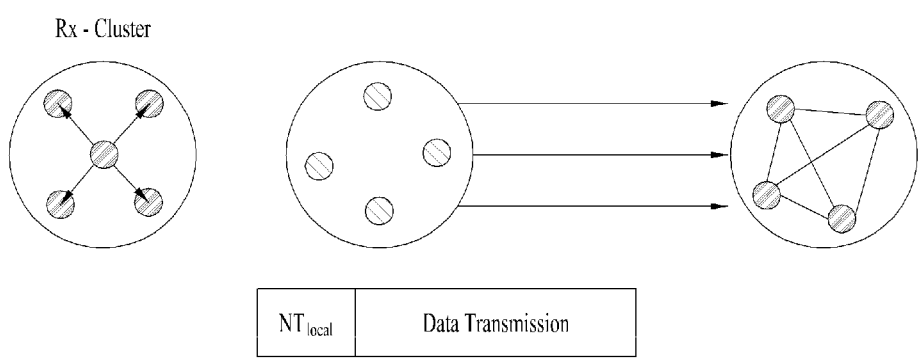
FIG. 7 illustrates Virtual-MIMO Equalizer with one cluster cooperation.

By allowing CSI exchange between receiver clusters, we can also achieve the multiplexing gain. As the receivers share the CSI of forward-links, the cooperative equalizer that mitigates the inter-user interference is computed at receivers. Compared with the VMIMO precoding scheme in section A, the proposed V-MIMO equalizer can be performed without the CSI feedback between receiver and transmission so that more time resources can be used for data transmission. FIG. 7 illustrates Virtual-MIMO Equalizer with one cluster cooperation. The proposed V-MIMO consists of following procedure as below.

B-1) Local Exchange

Assume that there are N receivers in the cluster and each receiver broadcasts the CSI of forward-links to other receivers during $T_{local}$. As the receiver sequentially exchanges the channel vector h, total time resource used in local exchange becomes $T=NT_{local}$.

B-2) Data Transmission and Detection

Each transmitter in cluster S sends its own message to the cluster D. Then, the receivers in cluster D computes the equalizer and detects the desired signals. Simply, we can construct ZF-equalizer is $\tilde{W}=[\tilde{w}_1, \ldots, \tilde{w}_N]$ is $\tilde{G}=(\tilde{H}^H\tilde{H})^{-1}\tilde{H}^H$, where $\tilde{H}=[\tilde{h}_1, \ldots, \tilde{h}_N]^T$.

<C. Virtual-MIMO with Eigenmode Transmission>

Figure 8:
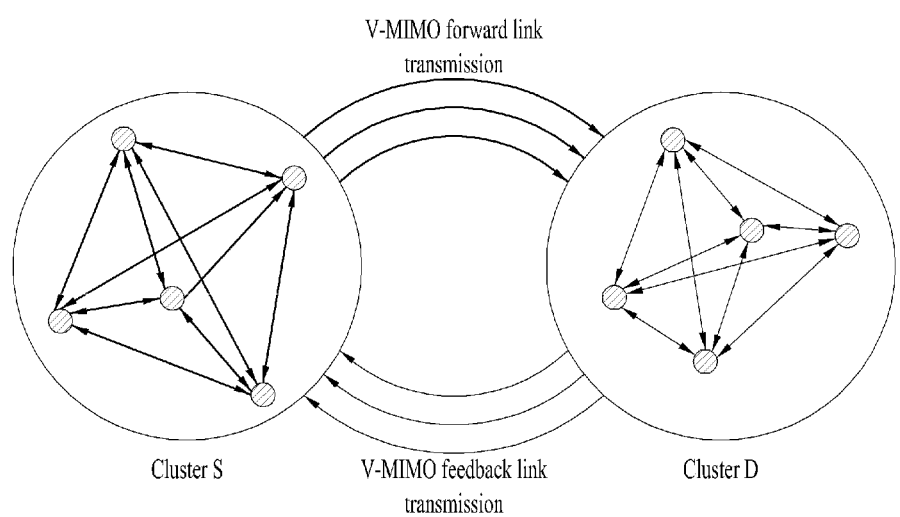
FIG. 8 illustrates Virtual-MIMO transmission with two cluster cooperation.

In earlier section, the virtual-MIMO feedback with one cluster cooperation, only the zero-forcing precoding was used to avoid the local exchange process at cluster S. This gives the advantage of avoiding an additional local exchange between the nodes in cluster D. However, in this section, we show the system with both of the cluster cooperating and process both precoding and decoding for forward link transmission as shown in FIG. 8. FIG. 8 illustrates Virtual-MIMO transmission with two cluster cooperation.

C-1) Precoder Design

In this section, we discuss the criteria used for precoder and decoder when two clusters cooperate for forward link data transmission. A pair of precoder and equalizer are designed under the orthogonality constraint $u_m^H h_{mn} v_n=0$, where m≠n.

Under this constraint, $U=[u_1, \ldots, u_N]$ and $V=[v_1, \ldots, v_N]$ are designed by decomposing H using the singular value decomposition (SVD) as following Equation 7.

$$H = USV^H = U \begin{bmatrix} \sqrt{\lambda_1} & \cdots & 0 \\ \vdots & \ddots & \vdots \\ 0 & \cdots & \sqrt{\lambda_N} \end{bmatrix} V^H \quad \text{(Equation 7)}$$

In Equation 7, the unitary matrix U and V are the left and right singular vectors of H as columns and $\lambda_m$ denote the eigen values of $HH^H$ following the descending order. The first M data streams will be chosen for data transmission. Let F=$[f_1, \ldots, f_N]$ be the precoder where F is the columns of V.

C-2) Quantized Precoder Feedback

After the nodes in D recognize the precoder its desired node in cluster S need to know, they quantize its precoder fn by finding the vector in a codebook and find $\hat{f}$. Then, the nodes in cluster D transmit the quantized precoder to the nodes in cluster S. Then, the nodes in cluster D design the equalizer according to the knowledge of the channel $h_n$ by the training signal from the nodes in cluster S and the knowledge of quantized precoder. Zero-forcing receiver is also applied in this system given by following Equation 8.

$$W=(H\hat{f}^H H\hat{f})^{-1} H\hat{f}^H \quad \text{<Equation 8>}$$

In Equation 8, $W=[w_1, \ldots, w_N]$ are the zero-forcing column vectors. Since the nodes in cluster D knows both channel information and the quantized precoder to transmit to the nodes in cluster S while the feedback link transmission, the optimal decoder can be designed with minimizing the residual interference. Then, the sum-rate capacity can be expressed as following Equation 9.

$$C = \sum_{n=1}^{N} \log\left(1 + \frac{Pd_{nn}^{-\alpha}|w_n^H h_n f_n|^2}{\sum_{m=1,m\neq n}^{N} Pd_{nm}^{-\alpha}|w_m^H h_m f_n|^2 + N_0}\right) \quad \text{(Equation 9)}$$

Since additional local exchange among nodes in cluster D is required for both precoding and decoding, twice of the local exchange overhead occurs compare to the local exchange overhead with one cluster cooperation. Giving $T_{total}$ as the total time resource allocated for feedback transmission, the time-slots used for feedback transmission used for virtual-MIMO feedback can be denoted as $T_{total}-2NT_{local}$. Then the n-th node in cluster D transmits the index of the codebook representing the quantized precoder, using $B_{v-MIMO}(n)$ bits denoted as following Equation 10.

$$B_{v-MIMO}(n) = (T_{total} - 2NT_{local}) \times F_{B.n}(n) \quad \text{(Equation 10)}$$

$$= T\log\left(1 + \frac{Pd_{nn}^{-\alpha}|w_n^H h_n f_n|^2}{\sum_{m=1,m\neq n}^{N} Pd_{nm}^{-\alpha}|w_m^H h_m f_n|^2 + N_0}\right)$$

In Equation 10, is $T_{total}-2NT_{local}$. Further, the number of total feedback bits used in can be represented as following Equation 11.

$$B_{FB,v-MIMO}=B_{FB,v-MIMO}(1)+ \ldots +B_{FB,v-MIMO}(N). \quad \text{<Equation 11>}$$

Figure 9:
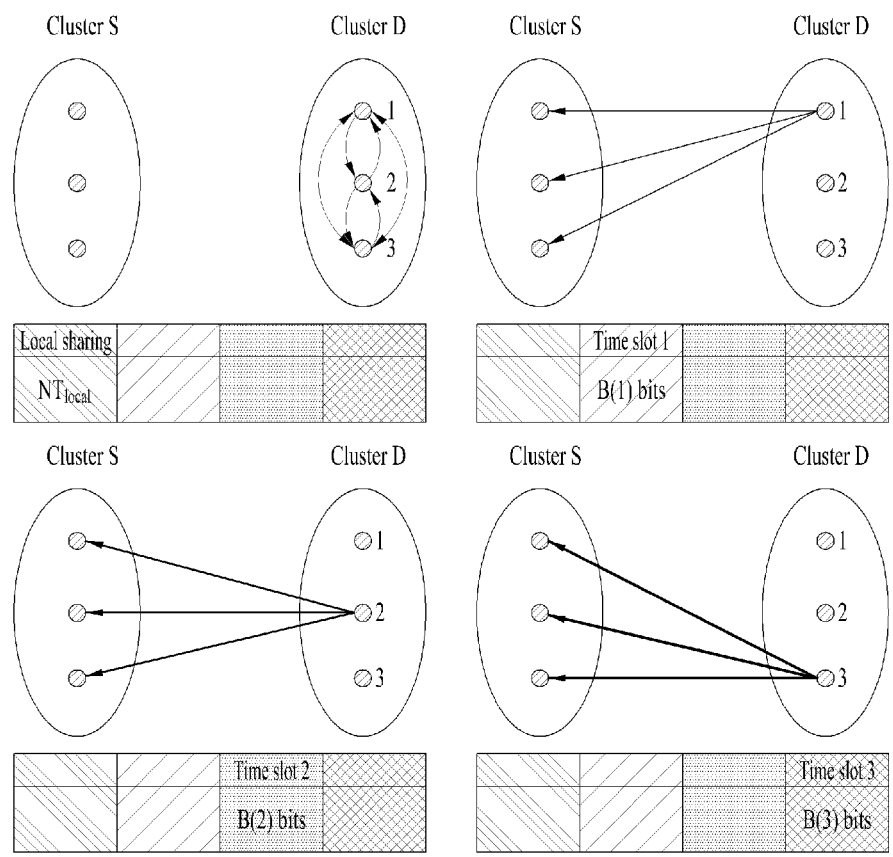
FIG. 9 illustrates Conventional independent feedback transmission with cluster D cooperating when N=3.

FIG. 9 illustrates Conventional independent feedback transmission with cluster D cooperating when N=3. And, FIG. 10 illustrates Virtual-MIMO feedback transmission with two cluster cooperation when N=3.

Figure 10:
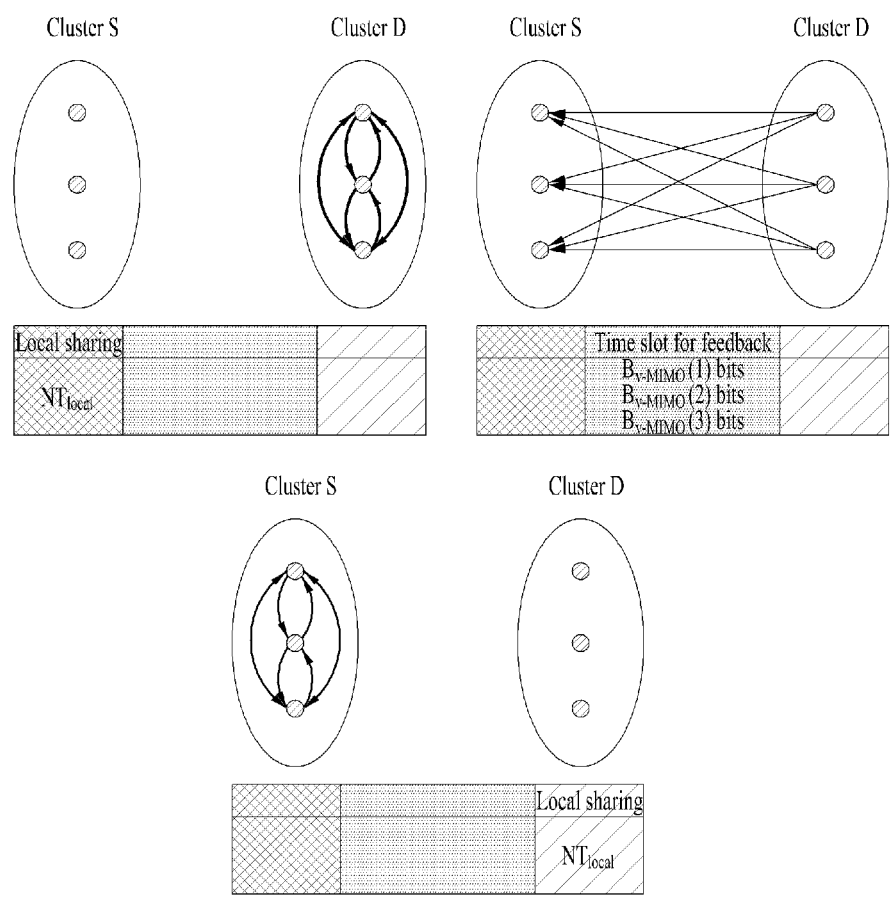
FIG. 10 illustrates Virtual-MIMO feedback transmission with two cluster cooperation when N=3.

Referring to FIGS. 9 and 10, when total time resource is allocated for feedback transmission, each node in cluster D uses $(T_{total}-3T_{local})/3$ time-slots for the quantized precoder feedback. Then the nth node in cluster D transmits quantized precoder using B(n) bits denoted as following Equation 12.

$$B(n) = \frac{T_{total} - 3T_{total}}{3} \times_{FB.n}(n)$$ (Equation 12)

$$= \frac{T_{total} - 3T_{total}}{3} \log\left(1 + \frac{Pd_{nn}^{-\alpha} |w_n^H h_n f_n|^2}{\sum_{m=1,m\neq n}^{3} Pd_{nm}^{-\alpha} |w_m^H h_m f_n|^2 + N_0}\right)$$

Figure 11:
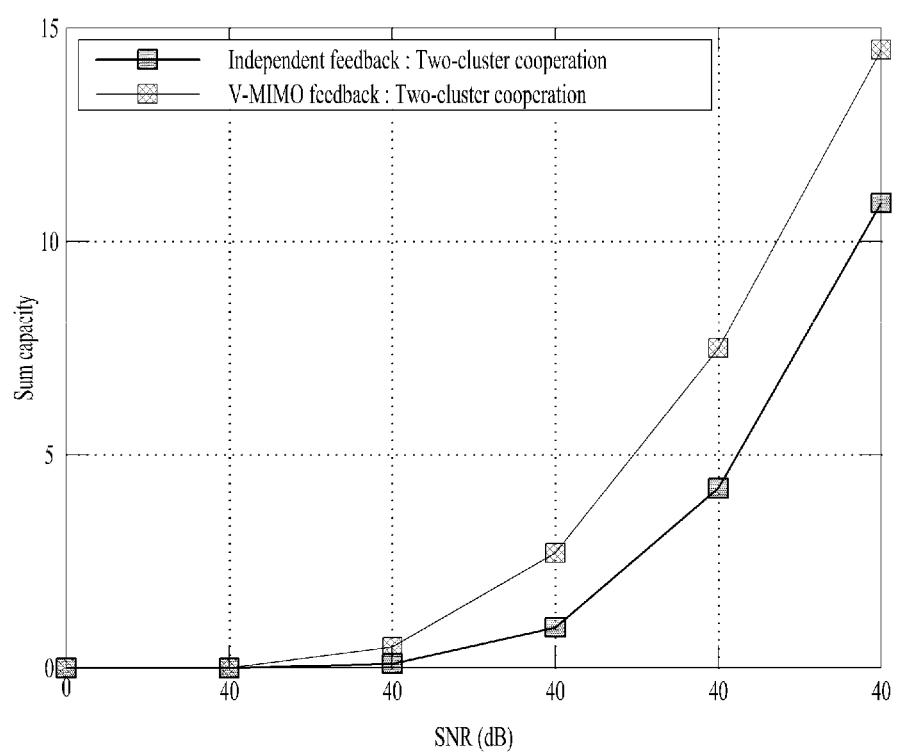
FIG. 11 illustrates comparison of sum-rate with two cluster cooperation between independent feedback and Virtual-MIMO feedback.
Figure 12:
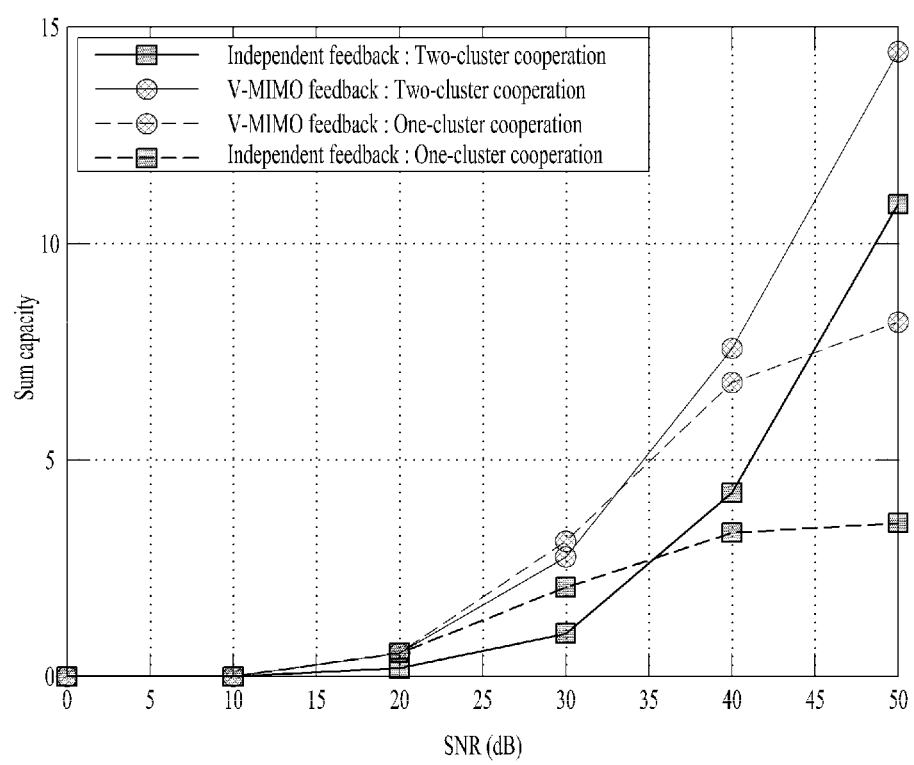
FIG. 12 illustrates comparison of sum-rate with both one cluster cooperation and two clusters cooperation between independent feedback and Virtual-MIMO feedback.
Figure 13:
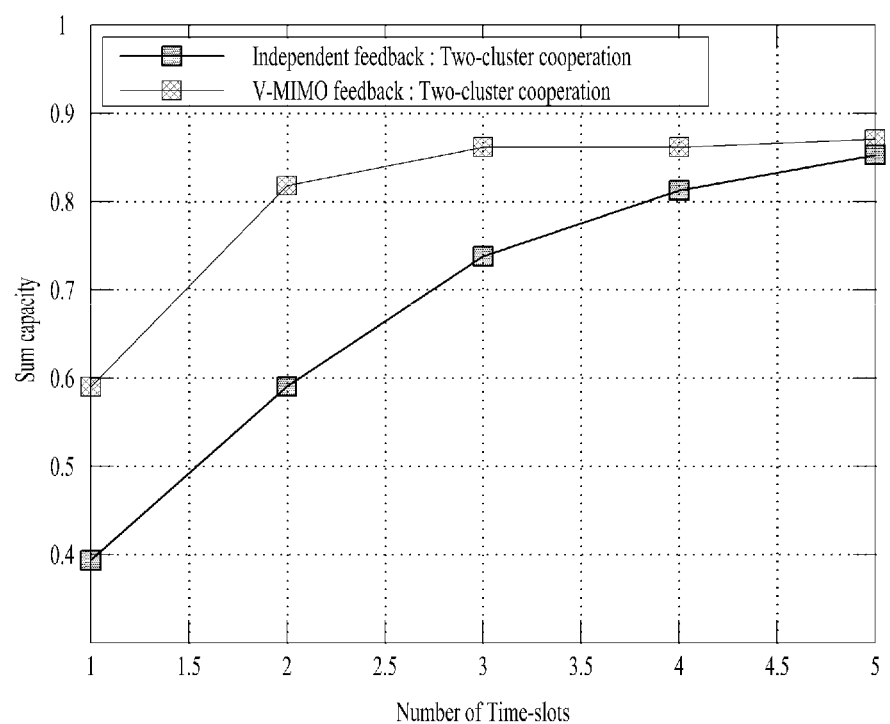
FIG. 13 illustrates comparison of sum-rate increasing the number of total time-slots allocated between independent feedback and Virtual-MIMO feedback.

FIG. 11 illustrates comparison of sum-rate with two cluster cooperation between independent feedback and Virtual-MIMO feedback. FIG. 12 illustrates comparison of sum-rate with both one cluster cooperation and two clusters cooperation between independent feedback and Virtual-MIMO feedback. FIG. 13 illustrates comparison of sum-rate increasing the number of total time-slots allocated between independent feedback and Virtual-MIMO feedback.

Referring to FIGS. 11-13, it can be noted the simulation is done with 6 pair of nodes distributed in each cluster S and cluster D when the ratio of the distance between nodes in a single cluster S and the distance between clusters $d_{cluster}=d_{local}$ is 5. The nodes in cluster S then select 3 data streams with maximum eigen value gained from SVD. The channel coefficients of feedback channel are considered steady during whole process time $T_{total}$.

As shown in FIG. 11, virtual-MIMO shows about 130% of the sum-rate capacity performance compare to the conventional independent feedback at SNR 50 dB. Further, FIG. 12 shows the comparison of the sum-rate performance between one cluster cooperation and two clusters cooperation. As shown in the figure, virtual-MIMO feedback system with one cluster cooperation shows better performance compare to the virtual-MIMO feedback with two cluster cooperation when SNR is lower than 33 dB. This result shows that in high SNR environment where SNR is higher than 33 dB, two clusters cooperation is better than one cluster cooperation although the local exchange overhead is larger.

FIG. 13 shows the comparison of sum-rate capacity between the conventional independent feedback and virtual-MIMO feedback by increasing the total number of time-slots allocated for feedback transmission when the number of pair of nodes N is 2 and SNR is set as 5 dB. As shown in the result, conventional feedback almost catches up the performance of the virtual-MIMO feedback when the total number of time-slots is 5.

<D. Incremental Precoder Updating on Admission of New Nodes>

D-1) Virtual MIMO Transmission Upon the Admission of New TX/RX

We consider the admission/exit of users over the virtual-MIMO networks. For the design of V-MIMO precoding at transmitters, new arrivals of users requires feedback of channel vectors and the computation of ZF precoders for V-MIMO transmission. Also, the departure of users needs the design of new precoders.

However, computing V-MIMO precoder requires inverse operation, which provides a high computational complexity at all transmitters. In this section, we propose the incremental update of V-MIMO precoder based on the previous one. The proposed method does not consist of matrix inversion and the precoder is sequentially updated by user admission or exit in the network.

In case that new RX arrives on the network, we propose the low-complexity based ZF precoder computation as following procedure.

1st step: New RX broadcasts channel vector $\tilde{h}$ to all TXs.
2nd step: TXs detect feedback CSI and update their forward-link precoder. More specifically, the 2nd step can be conducted as following Table 1.

TABLE 1

Old forward-link precoder: $F = H^T(HH^T)^{-1}$

New forward-link channel: $\tilde{H} = \begin{bmatrix} H \\ \tilde{h} \end{bmatrix}$ Define $B = HH^T$ and $\tilde{B} = \tilde{H}\tilde{H}^T$ $\tilde{B}^{-1} = B^{-1} - \dfrac{B^{-1}\tilde{h}^T \tilde{h} B^{-1}}{1 + \tilde{h}B^{-1}\tilde{h}^T}$ Update $\tilde{F} = \tilde{H}^T \tilde{B}^{-1}$ 3rd step: TXs performs ZF transmission using precoder $\tilde{F}$.

From the update of ZF precoder, we reduce inversion operation to compute ZF precoder, which shows high complexity in the large network.

While example shows a single RX arrival and the incremental update of precoding scheme, it can be extended on the both user admission and exit. Also, the update of precoding scheme in multiple user admission/exit can be considered. For V-MIMO equalizer, the update of equalizer can be done in new arrival/departure of users.

D-2) Incremental Update of SVD in Virtual MIMO with Eigenmode Transmission

In V-MIMO with eigenmode transmission, the low complexity computation of precoder/equalizer can be proposed by incremental update of SVD. Similar to previous section, new SVD computation due to the admission or departure of TX and RX can be updated by previous one.

Assuming that new TX arrived in V-MIMO eigenmode transmission, the precoder can be updated using a single channel vector c between the new TX and RXs, like as following followings steps 1~5.

step 1: Modify the old channel matrix H as $\tilde{H}=[H,c]$.
step 2: The SVD of the old channel matrix is $H=USV^\dagger$.
step 3: Define Q as a diagonal matrix with 1-column border:

$$Q = \begin{bmatrix} S & U^\dagger c \\ 0 & \|(I-UU^\dagger)c\| \end{bmatrix}$$

step 4: SVD decompose Q as $U'S'V'^\dagger$
step 5: The SVD of the new channel matrix is $\tilde{H}=\tilde{U}\tilde{S}\tilde{V}^\dagger$, where $\tilde{U}=[U,J]U'$, $$\tilde{V} = \begin{bmatrix} V & 0 \\ 0 & I \end{bmatrix}$$

with J is obtained by normalizing $(I-UU^\dagger)c$.

From the incremental precoder updating, the computational complexity reduces $O(m \times n^2)$ to $O(m \times n \times r^2)$. Therefore, the algorithm is efficient only if the virtual MIMO channel has low rank.

Above algorithm also can be extended in multiple RX/TX admission/exit cases.

The above-described embodiments of the present invention correspond to predetermined combinations of elements and features and characteristics of the present invention. Moreover, unless mentioned otherwise, the characteristics of the present invention may be considered as optional features of the present invention. Herein, each element or characteristic of the present invention may also be operated or performed without being combined with other elements or characteristics of the present invention.

Alternatively, the embodiment of the present invention may be realized by combining some of the elements and/or characteristics of the present invention. Additionally, the order of operations described according to the embodiment of the present invention may be varied. Furthermore, part of the configuration or characteristics of any one specific embodiment of the present invention may also be included in (or shared by) another embodiment of the present invention, or part of the configuration or characteristics of any one embodiment of the present invention may replace the respective configuration or characteristics of another embodiment of the present invention. Furthermore, it is apparent that claims that do not have any explicit citations within the scope of the claims of the present invention may either be combined to configure another embodiment of the present invention, or new claims may be added during the amendment of the present invention after the filing for the patent application of the present invention.

In the description of the present invention, the embodiments of the present invention have been described by mainly focusing on the data transmission and reception relation between the base station and the terminal (or user equipment). Occasionally, in the description of the present invention, particular operations of the present invention that are described as being performed by the base station may also be performed by an upper node of the base station. More specifically, in a network consisting of multiple network nodes including the base station, it is apparent that diverse operations that are performed in order to communicate with the terminal may be performed by the base station or b network nodes other than the base station. Herein, the term 'Base Station (BS)' may be replaced by other terms, such as fixed station, Node B, eNode B (eNB), Access Point (AP), and so on.

The above-described embodiments of the present invention may be implemented by using a variety of methods. For example, the embodiments of the present invention may be implemented in the form of hardware, firmware, or software, or in a combination of hardware, firmware, and/or software.

In case of implementing the embodiments of the present invention in the form of hardware, the method according to the embodiments of the present invention may be implemented by using at least one of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro controllers, micro processors, and so on.

In case of implementing the embodiments of the present invention in the form of firmware or software, the method according to the embodiments of the present invention may be implemented in the form of a module, procedure, or function performing the above-described functions or operations. A software code may be stored in a memory unit and driven by a processor. Herein, the memory unit may be located inside or outside of the processor, and the memory unit may transmit and receive data to and from the processor by using a wide range of methods that have already been disclosed.

As described above, the method for transmitting control information in wireless communication system and apparatus therefore according to the present invention are advantageous in that, in a wireless communication system, a transmitting end may effectively encode the control information according to the present invention. Also, the method for transmitting control information in wireless communication system and apparatus therefore according to the present invention may be applied to wireless communication systems. Most particularly, the present invention may be applied to wireless mobile communication apparatuses that are used for cellular systems.

The present invention may be realized in another concrete configuration (or formation) without deviating from the scope and spirit of the essential characteristics of the present invention. Therefore, in all aspect, the detailed description of present invention is intended to be understood and interpreted as an exemplary embodiment of the present invention without limitation. The scope of the present invention shall be decided based upon a reasonable interpretation of the appended claims of the present invention and shall come within the scope of the appended claims and their equivalents.

Therefore, it will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for communicating between first multiple nodes and second multiple nodes in a wireless communication system, the method comprising:
performing a first local sharing procedure for a virtual MIMO (Multiple Input Multiple Output) feedback among the second multiple nodes during a first predetermined time;
performing feedback of channel status information from the second multiple nodes to the first multiple nodes during an integer multiple of a second predetermined time; and
performing a second local sharing procedure for the virtual MIMO feedback among the first multiple nodes during the first predetermined time,
wherein the first local sharing procedure is used for sharing the channel status information and a quantized precoder among the second multiple nodes,
wherein, if at least one node is added in the first multiple nodes or second multiple nodes, a new precoder $\tilde{F}$ is updated based on a precoder F computed previously according to Equation 1 and Equation 2, below $$\tilde{F} = \tilde{H}^T \tilde{B}^{-1}, \qquad \text{<Equation 1>}$$

$$\tilde{B}^{-1} = B^{-1} - \frac{B^{-1}\tilde{h}^T \tilde{h} B^{-1}}{1 + \tilde{h} B^{-1} \tilde{h}^T} \qquad \text{< Equation 2 >}$$

wherein, a new channel matrix $\tilde{H}$ is $$\begin{bmatrix} H \\ \tilde{h} \end{bmatrix},$$

$\tilde{h}$ is channel vector of added node and $\tilde{B}$ is defined as $\tilde{H}\tilde{H}^T$, F is $H^T(HH^T)^{-1}$, H is an old channel matrix and B is defined as $HH^T$.

2. The method of claim 1, wherein the second multiple nodes are included in a destination cluster and the first multiple nodes are included in a source cluster.

3. The method of claim 1, wherein the second predetermined time is determined based on a total feedback time and the first predetermined time.

4. The method of claim 1, wherein each of feedback channels between the first multiple nodes and the second multiple nodes is orthogonal.

5. The method of claim 1, wherein the second local sharing procedure is used for sharing the feedback among the first multiple nodes.

6. The method of claim 1, wherein the first multiple nodes and the second multiple nodes are mobile stations.

7. The method of claim 1, wherein the first multiple nodes are transmitters and the second multiple nodes are receivers.

8. The method of claim 1, wherein each of the first multiple nodes is used for a virtual transmit antenna, and each of the first multiple nodes is used for a virtual receive antenna.

9. A wireless communication system comprising:
- a first cluster including first multiple nodes, wherein each of the first multiple nodes is used for a virtual transmit antenna; and
- a second cluster including second multiple nodes, wherein each of the second multiple nodes is used for a virtual receive antenna,
- wherein the second multiple nodes perform a first local sharing procedure for a virtual MIMO (Multiple Input Multiple Output) feedback during a first predetermined time,
- wherein feedback of channel status information is transmitted from the second multiple nodes to the first multiple nodes during an integer multiple of a second predetermined time,
- wherein the first multiple nodes performs a second local sharing procedure for the virtual MIMO feedback during the first predetermined time,
- wherein the first local sharing procedure is used for sharing the channel status information and a quantized precoder among the second multiple nodes,
- wherein, if at least one node is added in the first multiple nodes or second multiple nodes, a new precoder $\tilde{F}$ is updated based on a precoder F computed previously according to Equation 1 and Equation 2, below $$\tilde{F}=\tilde{H}^T\tilde{B}^{-1}, \qquad \text{<Equation 1>}$$

$$\tilde{B}^{-1} = B^{-1} - \frac{B^{-1}\tilde{h}^T\tilde{h}B^{-1}}{1+\tilde{h}B^{-1}\tilde{h}^T} \qquad \text{< Equation 2 >}$$

wherein, a new channel matrix $\tilde{H}$ is $$\begin{bmatrix} H \\ \tilde{h} \end{bmatrix},$$

$\tilde{h}$ is channel vector of added node and $\tilde{B}$ is defined as $\tilde{H}\tilde{H}^T$, F is $H^T(HH^T)^{-1}$, H is an old channel matrix and B is defined as $HH^T$.

10. The wireless communication system of claim 9, wherein the first multiple nodes and the second multiple nodes are mobile stations.

11. The wireless communication system of claim 9, wherein the second predetermined time is determined based on a total feedback time and the first predetermined time.

12. The wireless communication system of claim 9, wherein each of feedback channels between the first multiple nodes and the second multiple nodes is orthogonal.

13. The wireless communication system of claim 9, wherein the second local sharing procedure is used for sharing the feedback among the first multiple nodes.

* * * * *